United States Patent
Morimoto et al.

(10) Patent No.: US 7,628,335 B2
(45) Date of Patent: Dec. 8, 2009

(54) PORTABLE APPARATUS, STORAGE MEDIUM STORING PROGRAM OF CONTROLLING IC CARD FUNCTION LOCK, AND METHOD OF CONTROLLING IC CARD FUNCTION LOCK

(75) Inventors: Yoichi Morimoto, Kawasaki (JP); Munehisa Kamio, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 644 days.

(21) Appl. No.: 11/392,628

(22) Filed: Mar. 30, 2006

(65) Prior Publication Data

US 2007/0119952 A1    May 31, 2007

(30) Foreign Application Priority Data

Nov. 30, 2005    (JP) .............................. 2005-345778

(51) Int. Cl.
G06K 19/06 (2006.01)
G06K 5/00 (2006.01)
G06K 7/06 (2006.01)

(52) U.S. Cl. .................... 235/492; 235/380; 235/441

(58) Field of Classification Search .............. 235/380, 235/439, 441, 492
See application file for complete search history.

(56) References Cited

U.S. PATENT DOCUMENTS

| | | | | |
|---|---|---|---|---|
| 5,461,217 A * | 10/1995 | Claus | ........................ | 235/380 |
| 5,987,438 A * | 11/1999 | Nakano et al. | ................ | 705/41 |
| 2003/0006280 A1 | 1/2003 | Seita et al. | .................. | 235/380 |
| 2004/0097218 A1 | 5/2004 | Vossler | ........................ | 455/418 |
| 2005/0045731 A1 * | 3/2005 | Kojima et al. | ................ | 235/492 |
| 2005/0224587 A1 * | 10/2005 | Shin et al. | .................... | 235/492 |
| 2007/0029392 A1 * | 2/2007 | Nakatsugawa et al. | ...... | 235/492 |

FOREIGN PATENT DOCUMENTS

| | | |
|---|---|---|
| DE | 100 00 995 | 8/2000 |
| EP | 0803830 | 10/1997 |
| JP | 2000-099603 | 4/2000 |
| JP | 2000-184055 | 6/2000 |
| JP | 2000-311223 | 11/2000 |
| JP | 2003-208585 | 7/2003 |

OTHER PUBLICATIONS

Partial European Search Report dated Feb. 21, 2007 in corresponding European Application No. EP 06 11 1506.
European Search Report issued in European Patent Application No. 06111506.9 dated Jul. 12, 2007 (15 pages).

* cited by examiner

*Primary Examiner*—Thien M. Le
*Assistant Examiner*—April A Taylor
(74) *Attorney, Agent, or Firm*—Staas & Halsey LLP

(57) ABSTRACT

A portable apparatus includes an IC card function capable of performing a predetermined operation via wireless communications. The apparatus further includes; a lock switching operation section which switches the IC card function between a locked state in which the IC card function is ineffective and an unlocked state in which the IC card function is effective according to user operation; a timer which measures time from a point in time when the IC card function is unlocked by user operation through the lock switching operation section; and an auto-locking processing section which automatically changes the IC card function to the locked state when the time measured by the timer reaches a predetermined threshold time.

17 Claims, 12 Drawing Sheets

PORTABLE APPARATUS, STORAGE MEDIUM STORING PROGRAM OF CONTROLLING IC CARD FUNCTION LOCK, AND METHOD OF CONTROLLING IC CARD FUNCTION LOCK

BACKGROUND OF THE INVENTION

1. Field of the Invention

The present invention relates to a portable apparatus having IC card function, a storage medium that stores a program for controlling the enabling and disabling of the IC card function in the portable apparatus when executed in the portable apparatus, and a method of controlling the locking and unlocking of the IC card function in the portable apparatus.

2. Description of the Related Art

In recent years, IC cards having IC chips embedded therein are widely used. When brought close to a device capable of performing short-distance radio communications, an IC card performs predetermined processing such as billing etc. between the device and the IC chip embedded in the IC card. Lately, portable terminals such as portable telephones having IC card function are also available.

As the IC cards are becoming popular, the security problem of how to prevent IC card fraud has arisen.

For the purpose of improving the security of IC card, Japanese Patent Application Publication No. 2000-311223 proposes an IC card that is enabled only for a predetermined period of time from the initial use date and disabled after that period. Also, Japanese Patent Application Publication No. 2003-208585 proposes a technique that enables processing using an IC card only for a predetermined time after the IC card is inserted into an IC card reader/writer and authenticated.

Also, Japanese Patent Application Publication No. 2000-184055 proposes a technique that relates to the answering function of a portable telephone and switches the answering function between an enabled state and a disabled state according to a time schedule.

Also, Japanese Patent Application Publication No. 2000-99603 proposes a technique for providing a time frame during which an IC card becomes effective.

The technique disclosed in Japanese Patent Application Publication No. 2000-311223 enables the IC card for only one period of time lasting for a predetermined number of days from the initial use date. During this period of time, security is not established. If this period of time is reduced to improve the security, the IC card will be available only for a short period of time, which is inconvenient for a user.

The technique disclosed in Japanese Patent Application Publication No. 2003-208585 is based on the premise that the IC card is inserted into the IC card reader/writer. Therefore, this technique is not applicable to an IC card function incorporated in a portable terminal.

It is conceivable to lock/unlock the IC card function in a time schedule by employing the techniques disclosed in Japanese Patent Application Publication No. 2000-184055 or to set up a time frame where the IC card function becomes effective like the time frame disclosed in Japanese Patent Application Publication No. 2000-99603. However, providing either one of these techniques alone is not safe enough because the lock might be released when a user is unaware of or forgets such a time schedule or time frame.

Under such circumstances, the present invention provides a portable apparatus having IC card function, a storage medium that stores a program for controlling the enabling and disabling of the IC card function in the portable apparatus when executed in the portable apparatus, and a method of controlling the locking and unlocking of the IC card function in the portable apparatus, in all which the security of the IC card function has been improved.

SUMMARY OF THE INVENTION

In view of the foregoing, the present invention provides a portable apparatus which has an IC card function capable of performing a predetermined operation via wireless communications, the portable apparatus including:

a lock switching operation section which switches the IC card function between a locked state in which the IC card function is ineffective and an unlocked state in which the IC card function is effective according to user operation;

a timer which measures time from a point in time when the IC card function is unlocked by user operation through the lock switching operation section; and an auto-locking processing section which automatically changes the IC card function to the locked state when the time measured by the timer reaches a predetermined threshold time.

The portable apparatus of the invention has the lock switching operation section and configured such that every time the IC card function is unlocked by user operation through the lock switching operation section, the IC card function is locked after a lapse of a predetermined threshold time. Therefore, the apparatus allows a user to unlock the IC card function whenever necessary while carrying it and automatically unlocks the IC card function even when the user forgets to lock it again, thereby providing convenience while ensuring high security.

The portable apparatus according to the invention may further include a threshold setting section which sets the predetermined threshold time according to user operation.

The portable apparatus further improves both user convenience and security if a user is allowed to set a minimum length of threshold time as desired.

The portable apparatus according to the invention may further include a power switch which turns on and off a power of the portable apparatus, wherein the auto-locking processing section changes the IC card function to the locked state when the power is turned off, after the IC card function is unlocked by user operation through the lock switching operation section and before the time measured by the timer reaches the predetermined threshold time.

If the IC card function is shifted between the locked state and the unlocked state while the power is off, it is necessary to keep supplying power to a circuit for performing such shifting even during the power off, which is not desirable. To avoid such a disadvantage, the portable apparatus of the invention is capable of changing the state of the IC card function at the time of power off or power on again.

The portable apparatus according to the invention may further include:

a clock section which keeps the current time; and a schedule management section which changes the IC card function from the locked state to the unlocked state and from the unlocked state to the locked state according to a schedule.

This additional feature of the apparatus eliminates the need for unlocking user operation in such a case that the IC card function is used at the same specified time every day, which further improves convenience.

Additionally, the portable apparatus according to the invention may be configured such that the schedule management section stops a function of the auto-locking processing section upon changing the IC card function from the locked state to the unlocked state, and restores the function of the auto-locking processing section upon changing the IC card function from the unlocked state to the locked state.

This additional feature makes it possible to avoid a conflict between processing of the schedule management section and that of the auto-locking processing section.

Furthermore, the portable apparatus of the invention may be configured such that in such a case that the IC card function is already in the unlocked state at a first time of shifting the IC card function from the locked state to the unlocked state, the schedule management section maintains the locked state or the unlocked state of the IC card function established immediately before a second time of shifting the IC card function from the unlocked state to the locked state even when the second time arrives. Similarly, the portable apparatus according to the invention may be configured such that in such a case that the lock switching operation section is operated once or more after a time of shifting the IC card function from the locked state to the unlocked state and before a time of shifting the IC card function from the unlocked state to the locked state, the schedule management section maintains the locked state or the unlocked state of the IC card function established immediately before the time of shifting the IC card function from the unlocked state to the locked state even when the time of shifting the IC card function from the unlocked state to the locked state arrives.

The schedule management section unlocks and locks the IC card function always according to a time schedule and gives way to user operation when the user operation takes place.

The portable apparatus according to the invention may further include a power switch which turns on and off a power of the portable apparatus, wherein in such a case that the power is turned off after a time of shifting the IC card function from the locked state to the unlocked state and before a time of shifting the IC card function from the unlocked state to the locked state, the schedule management section shifts the IC card function from the unlocked state to the locked state when the power is turned on or when the time of shifting the IC card function from the unlocked state to the locked state arrives, whichever is later.

The schedule management section is intended to keep the IC card function in the unlocked state in a time frame after an unlocking time and before a locking time according to a schedule. Therefore, it is desirable that, when the power is turned off in the middle of the time frame, the schedule management section shifts the IC card function to the locked state at whichever later one of the above-described two events.

The present invention also provides a storage medium which stores a program of controlling IC card function lock, the program being executed in a portable apparatus having an IC card function capable of performing a predetermined operation via wireless communications and causes the portable apparatus to operate as an apparatus including:

a lock switching operation section which switches the IC card function between a locked state in which the IC card function is ineffective and an unlocked state in which the IC card function is effective according to user operation;

a timer which measures time from a point in time when the IC card function is unlocked by user operation through the lock switching operation section; and an auto-locking processing section which automatically changes the IC card function to the locked state when the time measured by the timer reaches a predetermined threshold time.

The present invention also provides a method of controlling locking and unlocking of an IC card function incorporated in a portable apparatus and capable of performing a predetermined operation via wireless communications, the portable apparatus comprising a lock switching operation section which switches the IC card function between a locked state in which the IC card function is ineffective and an unlocked state in which the IC card function is effective according to user operation, the method including the steps of:

measuring time from a point in time when the IC card function is unlocked by user operation through the lock switching operation section; and auto-locking the IC card function by automatically changing the IC card function to the locked state when the time measured by the timer reaches a predetermined threshold time.

Although only the basic feature of the program storage medium and that of the method according to the invention are described above, they respectively include features corresponding to the above-described various features of the portable apparatus according to the invention.

DETAILED DESCRIPTION OF THE INVENTION

An embodiment of the present invention will be described.

Figure 1:
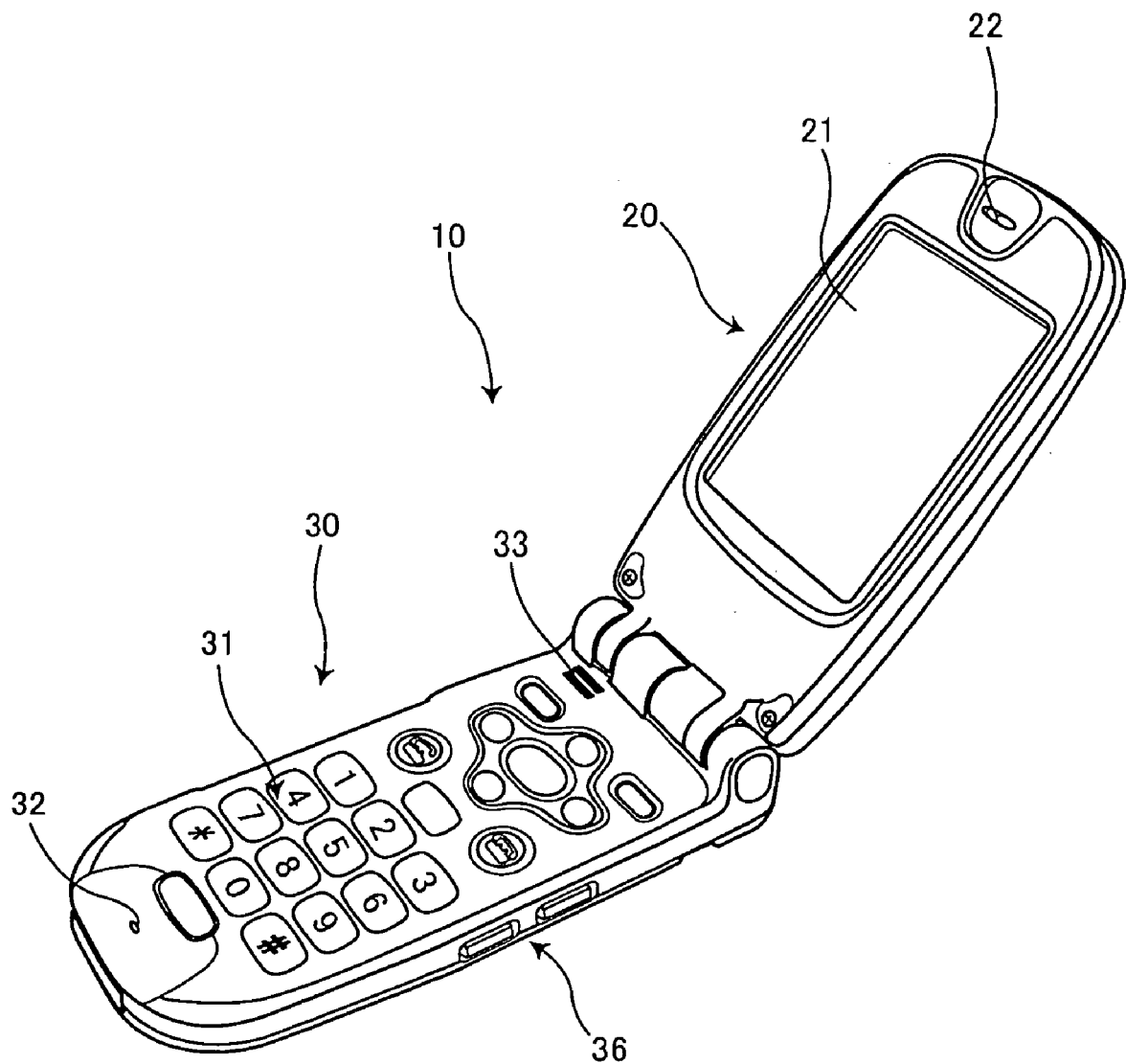
FIG. 1 is an external perspective view of a portable terminal according an embodiment of the invention, as viewed from the front.
Figure 2:
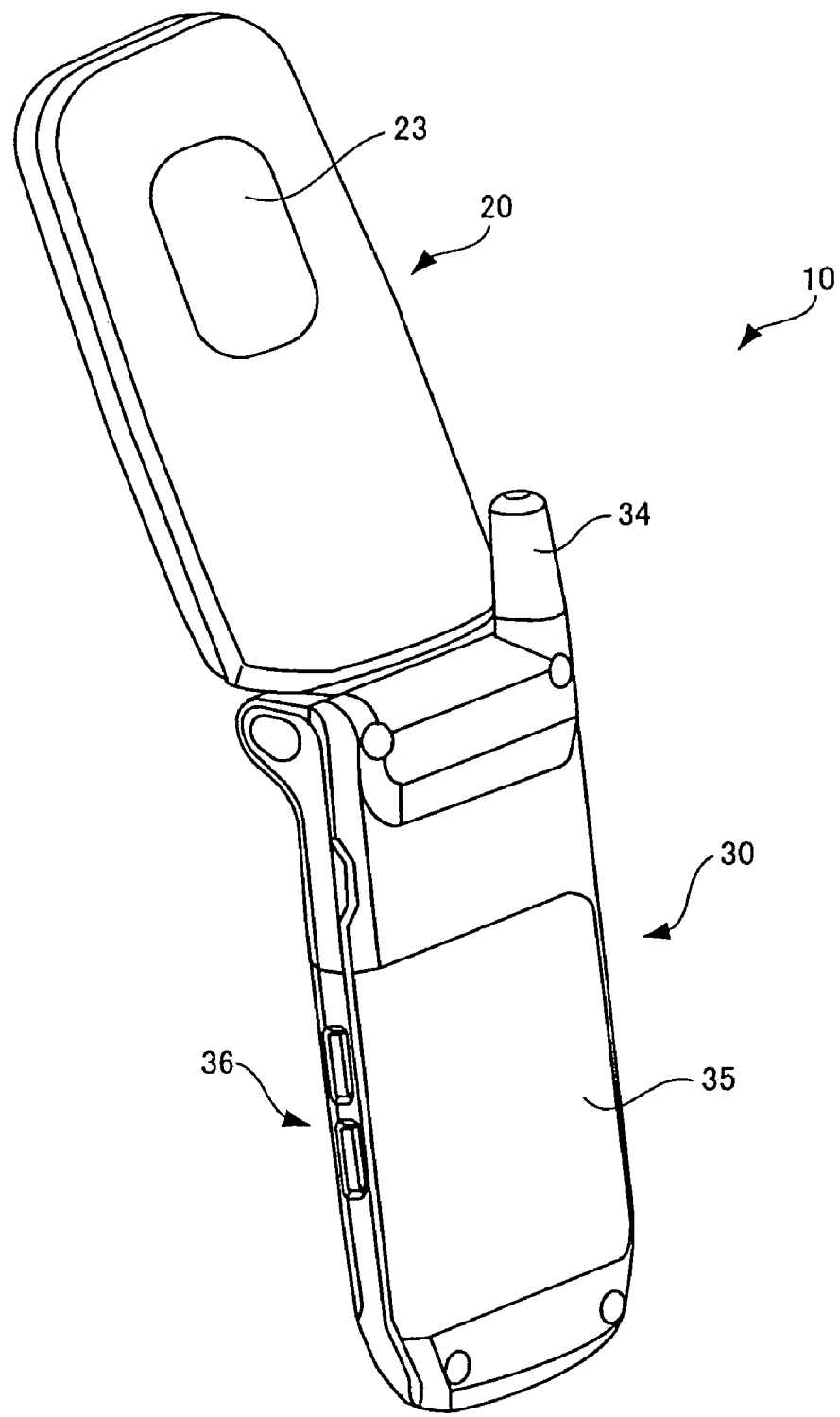
FIG. 2 is an external perspective view of the portable terminal shown in FIG. 1, as viewed from the back.

FIG. 1 is an external perspective view of a portable terminal device 10 according an embodiment of the invention, as viewed from the front. FIG. 2 is an external perspective view of the portable terminal device 10 shown in FIG. 1, as viewed from the back.

The portable terminal device 10 is composed of an upper case 20 and a lower case 30 which are openable and closable with respect to each other. As shown in FIG. 1, the front of the upper case 20 is provided with a screen display window 21 for displaying images and covered with a window member such as a transparent acrylic plate and an earpiece 22 having a small speaker therein and transmitting a sound when brought close to a user's ear. Meanwhile, as shown in FIG. 2, the back of the upper case 20 is provided with a smaller subscreen display window 23 for displaying time and other images. The subscreen display window 23 is also covered with a window member such as a transparent acrylic plate.

As shown in FIG. 1, the lower case 30 has multiple operating buttons 31 on the front and a small microphone in the inside. The lower case 30 also has a mouthpiece 32 for transmitting user's voice to the microphone and a sound outlet 33 for sending out a sound emitted from a speaker disposed at the back thereof, which sound is loud enough to hear without bringing the apparatus close to a user's ear. Meanwhile, as shown in FIG. 2, the back of the lower case 30 is provided with an antenna 34 and a battery lid 35 for covering a battery pack inserted into a battery chamber formed inside. Further, operating buttons 36 are disposed on a frank of the lower case 30.

The portable terminal device 10 shown in FIGS. 1 and 2 is provided with an IC chip (RFID) for IC card and therefore has the function of serving as an IC card in addition to the function of sending/receiving calls and emails.

Figure 3:
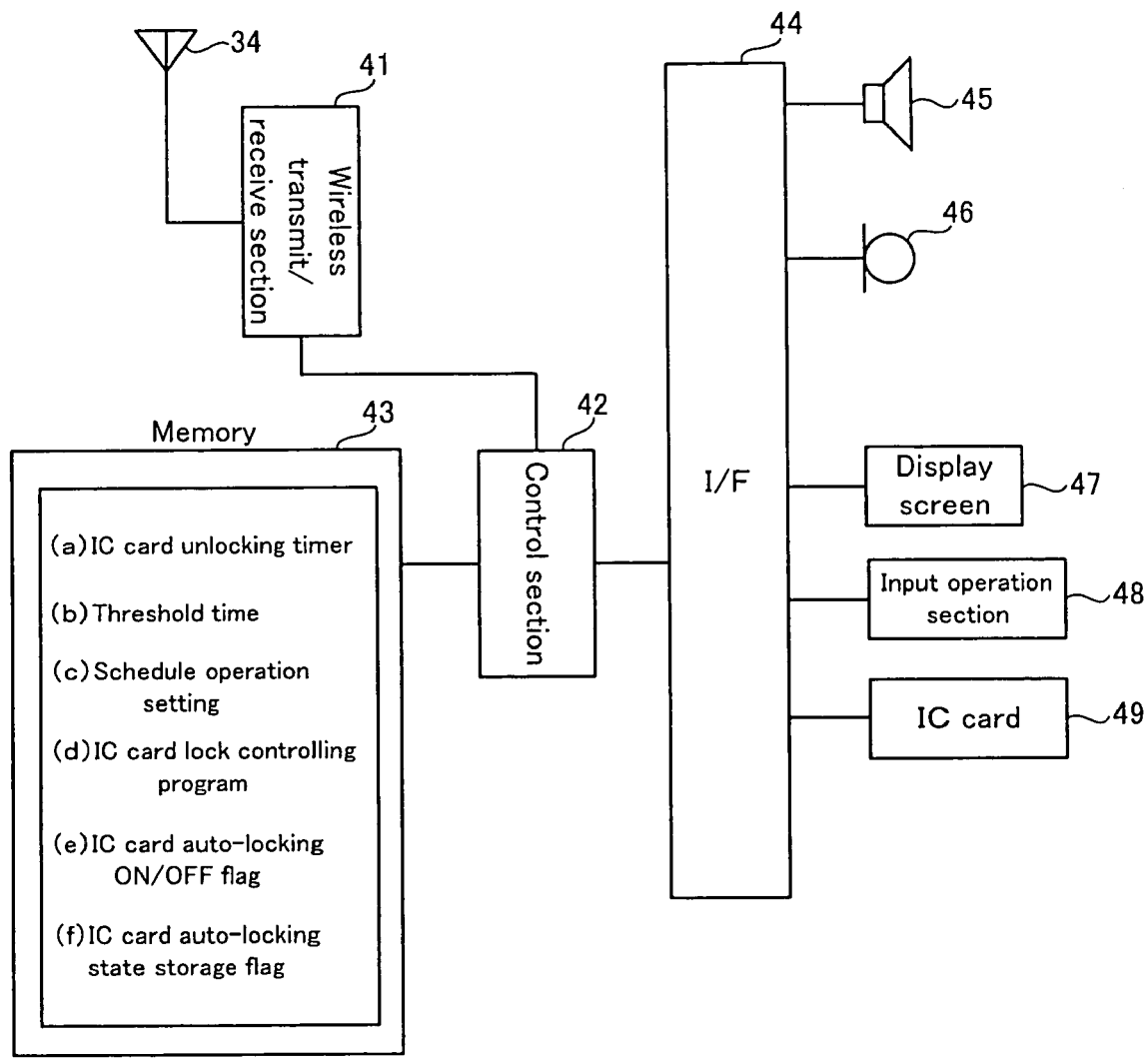
FIG. 3 is a block diagram showing the internal structure of the portable terminal shown in FIGS. 1 and 2.

FIG. 3 is a block diagram showing the internal structure of the portable terminal device 10 shown in FIGS. 1 and 2.

FIG. 3 shows an antenna 34, a wireless transmit/receive section 41, a control section 42, a memory 43, an interface (I/F) 44, a speaker 45, a microphone 46, a display screen 47, an input operation section 48, and an IC card 49.

The wireless transmit/receive section 41 is a circuit block for wirelessly transmitting signals received from the control section 42 via the antenna 34 and for wirelessly receiving signals via the antenna 34 to transfer the received signals to the control section 42. The control section 42 is a block for controlling the operation of the entire portable terminal device 10 and performing various processing by executing programs. The memory 43 stores various values and programs required for operation of the portable terminal device 10. As elements required for the locking and unlocking of the IC card function which will be described later, FIG. 3 shows (a) a timer program for implementing an IC card unlocking timer, (b) a threshold time to be compared with a time measured by the IC card unlocking timer, (c) a time schedule according to which the IC card is locked or unlocked, (d) an IC card lock controlling program for controlling the locking and unlocking of the IC card, (e) an IC card auto-locking ON/OFF flag for indicating whether the IC card auto-locking is effective (ON) or ineffective (OFF), and (f) an IC card auto-locking state storage flag used for storing the IC card auto-locking state. The details of these elements will be described later. The elements (b) threshold time, (c) time schedule and (e) IC card auto-locking ON/OFF flag can be changed by user operations through the input operation section 48 which will be described later.

The interface 44 links the control section 42 with the speaker 45, microphone 46, display screen 47, input operation section 48 and IC card 49 to exchange signals therebetween.

The speaker 45 outputs audio signals sent from the control section 42 via the interface 44 as a sound. The microphone 46 picks up and sends user's voice to the control section 42. Telephone conversations are made through the speaker 45 and microphone 46.

In FIG. 3, the display screen 47 is shown as one block representing a main screen that is seen through the screen display window 21 shown in FIG. 1 and a subscreen that is seen through the subscreen display window 23 shown in FIG. 2. Input e-mail text, received e-mails, various kinds of information and the like are displayed on the display screen 47. The input operation section 48 is a block representing the operating buttons 31 shown in FIG. 1 and 36 shown in FIGS. 1 and 2. The input operation section 48 allows a user to input e-mail text and various instructions.

The IC card 49 is a block for implementing the function as an IC card. The IC card 49 is not necessarily shaped like a card. Even when the power of the portable terminal device 10 is turned OFF, the IC card 49 is supplied with power and therefore capable of operating. However, to disable (lock) and to enable (unlock) the function of the IC card 49 are performed based on instructions provided by the control section 42 and therefore these are allowed only when the power of the portable terminal device 10 is turned ON.

The portable terminal device 10 is capable of operating by receiving power from a removable battery pack being inserted therein. Therefore, if the battery pack is caused to come off the portable terminal device 10, for example, by the device 10 being dropped, power supply to the IC card 49 is stopped and the IC card 49 is automatically locked.

Now, there will be mainly described operations of the IC card 49 changing between a locked state and an unlocked state.

Figure 4:
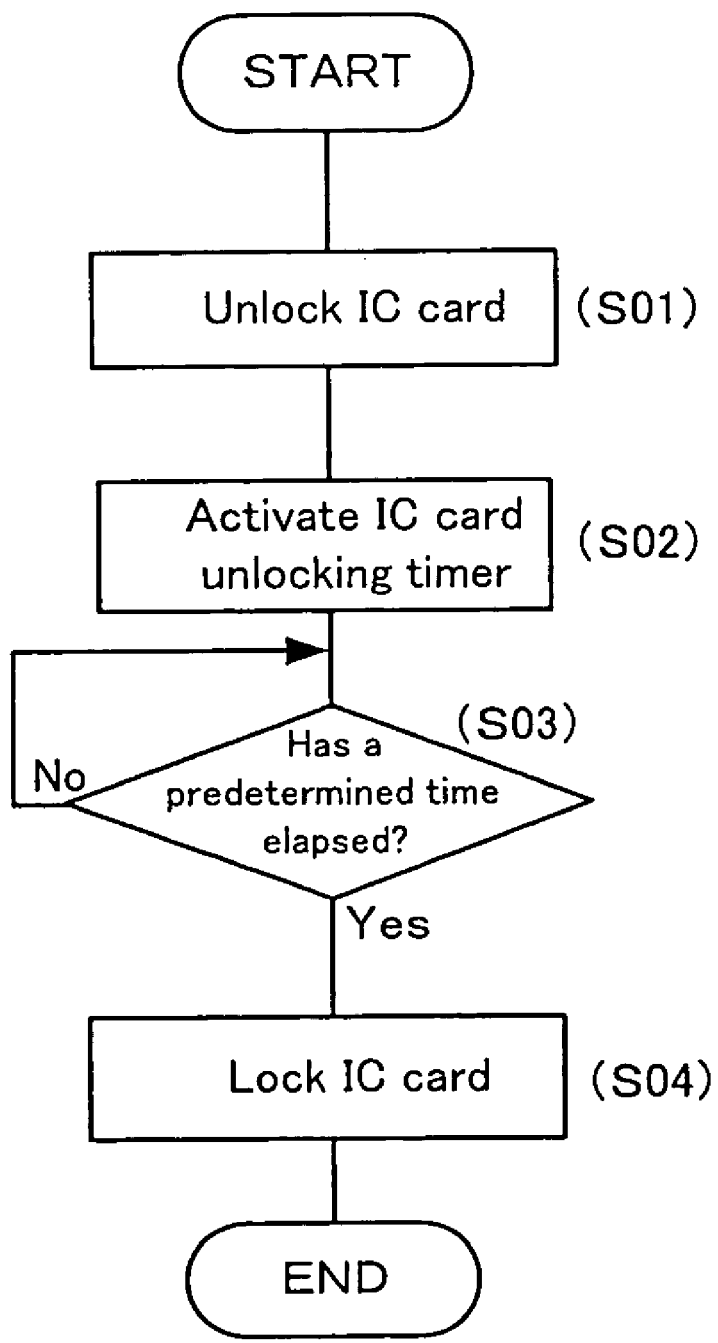
FIG. 4 is a flowchart showing an IC card auto-locking program that is part of an IC card lock controlling program.

FIG. 4 is a flowchart showing an IC card auto-locking program that is part of the IC card lock controlling program, stored in the memory 43 and executed by the control section 42.

When the IC card auto-locking becomes effective (when IC card auto-locking ON/OFF flag stored in the memory 43 shown in FIG. 3 is ON) by user operation for locking the IC card 49 through the input operation section 48 shown in FIG. 3, execution of the IC card auto-locking program shown in FIG. 4 begins.

First, the IC card 49 (see FIG. 3) is unlocked (step S01) and then the IC card unlocking timer is activated (step S02) to start measuring time thereafter. After a predetermine lapse of time ((b) threshold time stored in the memory 43 shown in FIG. 3) measured by the IC card unlocking timer, the IC card 49 is locked again (step S04).

In this way, when user operation for locking the IC card 49 is performed, the IC card 49 is unlocked once and locked again after a predetermined time (threshold time). If the IC card 49 is in the unlocked state when the user operation for locking the IC card 49 is performed, the IC card 49 is shifted to the locked state upon such user operation.

Figure 5:
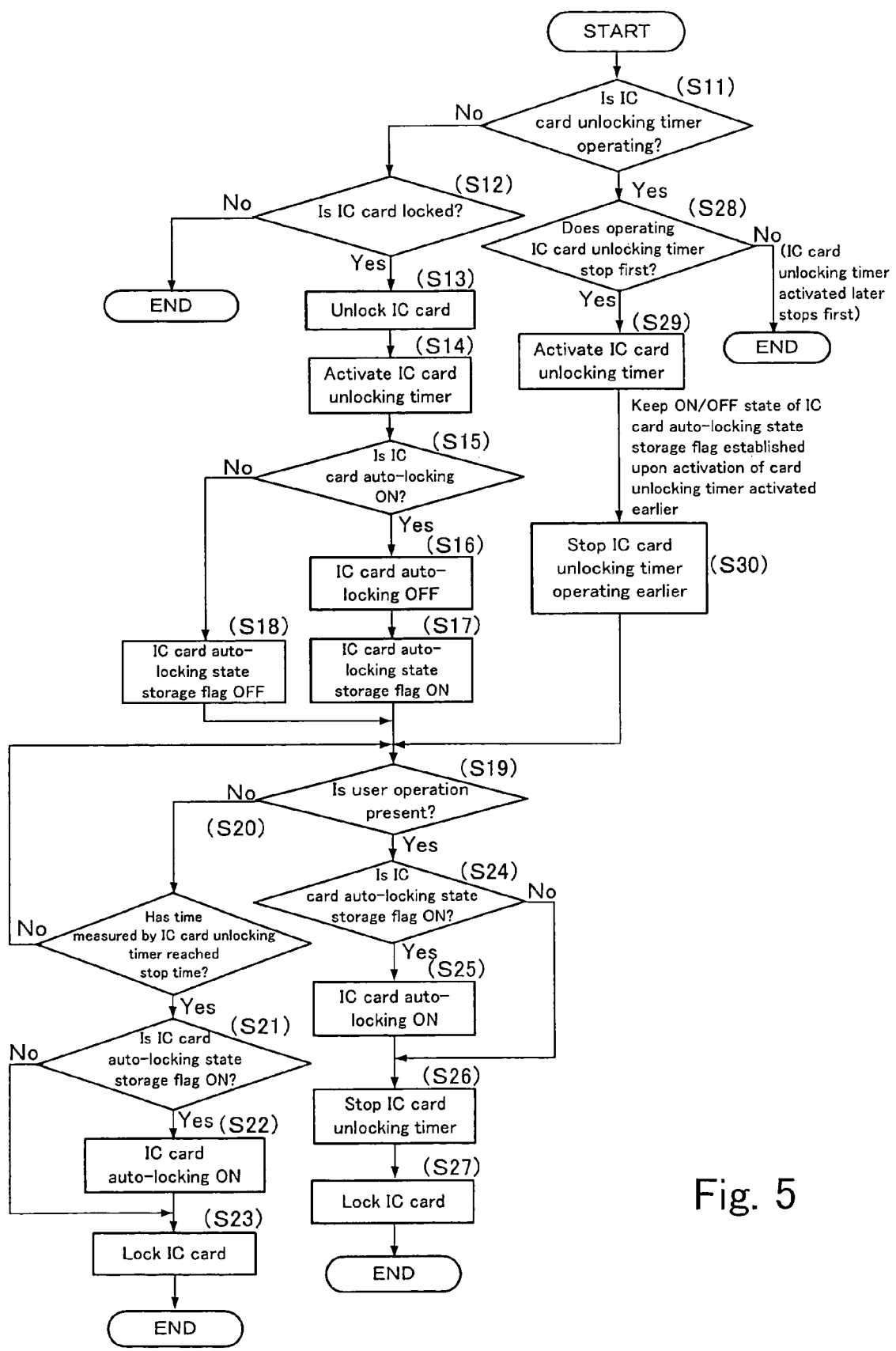
FIG. 5 is a flowchart showing a schedule management program that is part of the IC card lock controlling program.

FIG. 5 is a flowchart showing a schedule management program that is part of the IC card lock controlling program. The control section 42 shown in FIG. 3 has a clock to keep the current time. The schedule management program shown in FIG. 5 is executed when an unlocking time in the (c) schedule stored in the memory 43 arrives.

When execution of the schedule management program begins, it is determined whether the IC card unlocking timer is operating or not (step S11).

Figure 6:
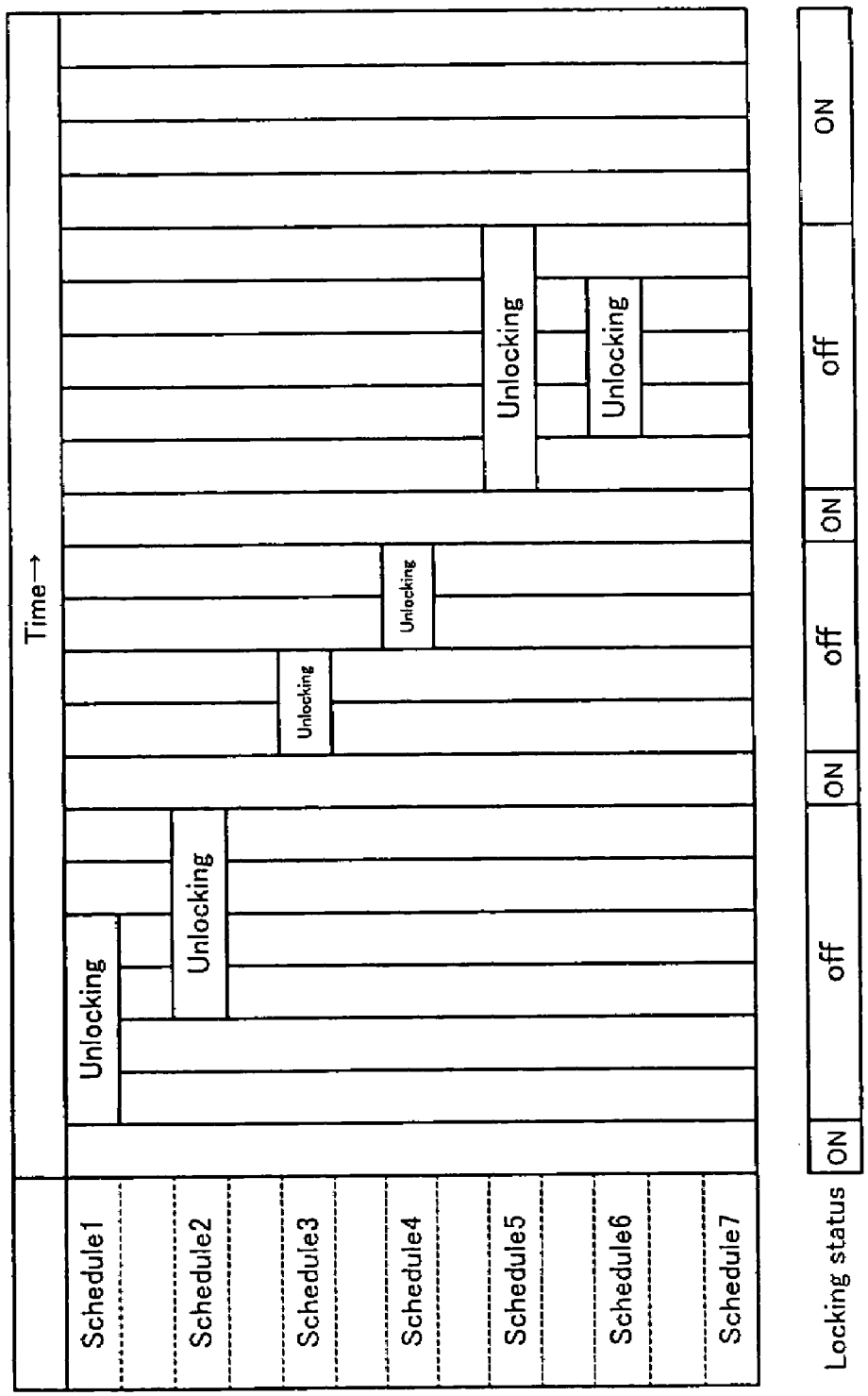
FIG. 6 is a chart showing a shifting pattern of the locking state (ON/OFF) in a case where two or more schedules are set up.

Step S11 will be described with reference to FIG. 6. FIG. 6 will be described later more in detail.

In the present embodiment, there are seven schedules. Each schedule includes a time of shifting from locked state (ON) to unlocked state (OFF) and a time of shifting from unlocked state (OFF) to locked state (ON) in a pair. The seven schedules are referred to as schedules 1 through 7. In each schedule (e.g. schedule 1), when a time of shifting from locked state (ON) to unlocked state (OFF) arrives, the locking state of the IC card 49 is shifted from ON to OFF and the IC card unlocking timer starts measuring a lapse of time up to a time of shifting from unlocked state (OFF) to locked state (ON). When the measurement of the lapse of time is complete, the locking state of the IC card 49 is shifted from OFF to ON. As shown in FIG. 6, schedules 1 and 2 are set up such that when the locking state of the IC card 49 is shifted from ON to OFF in schedule 1, the IC card unlocking timer starts measuring a lapse of time thereafter, and while the IC card unlocking timer is thus operating, i.e. while the IC card 49 is in locked state (OFF), a time of shifting from locked state (ON) to unlocked state (OFF) arrives in schedule 2. Step S11 shown in FIG. 5 is a step for determining such a status.

When it is determined that the IC card unlocking timer is operating at step S11 (e.g. when it is determined that the IC card unlocking timer is operating in schedule 1 when the locking state is shifted from ON to OFF in schedule 2 as shown in FIG. 6), the flow proceeds to step S28. When it is determined that the IC card unlocking timer is not operating at step S11, the flow goes to step S12, which takes place in a simple case. At step S12, it is determined whether the IC card 49 is locked (in a locked state (ON)) or not. If it is determined that the IC card 49 is unlocked (unlocked state (OFF)) at step S12, this result means the locking state is changed to OFF by user operation before it is shifted from locked state (ON) to unlocked state (OFF) according to the schedule. When it is determined the IC card 49 is unlocked (unlocked state (OFF)) at step S12, the flow ends without any operation, specifically, without activating the IC card unlocking timer.

On the other hand, when it is determined that the IC card 49 is locked at step S12, the flow goes to step S13 where the IC card 49 is unlocked and further, the IC card unlocking timer is activated and starts measuring time (step S14). At the subsequent step S15, it is determined whether the IC card auto-locking state is ON or not. The "IC card auto-locking state is ON" means that user operation has made the program of the flowchart in FIG. 4 ready to be activated. Whether the "IC card auto-locking state is ON" or not can be determined by reference to the IC card auto-locking ON/OFF flag stored in the memory 43 shown in FIG. 3. When the IC card auto-locking state is OFF, the locking state of the IC card 49 simply shifts from ON to OFF upon user's unlocking operation and shifts from OFF to ON upon user's locking operation. The relationship between the user operation and the schedule management program shown in FIG. 5 will be described later with reference to step S19 and thereafter.

If it is determined that the IC card auto-locking state is ON at step S15, the flow goes to step S16 where the IC card auto-locking is changed to OFF (the IC card auto-locking ON/OFF flag shown in FIG. 3 is changed to OFF) and further the IC card auto-locking state storage flag shown in FIG. 3 is set to ON. The IC card auto-locking state storage flag is used to keep information as to whether or not the IC card auto-locking is restored to ON state (the IC card auto-locking ON/OFF flag is returned to ON) later (see steps S22 and S25). In contrast, If it is determined that the IC card auto-locking state is not ON at step S15, the flow goes to step S18 where the IC card auto-locking state storage flag is reset to OFF.

After the IC card auto-locking state storage flag is set to ON at step S17 or is reset to OFF at step S18, it is determined whether user operation for shifting to locking state is present or not (at step S19). If the result is No at step S19, the flow goes to step S20 where it is determined whether the time measured by the IC card unlocking timer has reached a stop time (time to shift the IC card 49 from the unlocked state to the locked state) or not.

When the result is Yes at step S20, the flow goes to step S21 where it is determined whether the IC card auto-locking state storage flag is ON or not. If the IC card auto-locking state storage flag is ON, the IC card auto-locking ON/OFF flag is returned to ON so that the routine of the IC card auto-locking (see FIG. 4) is brought to ON state (step S22). After step S22, the IC card 49 is returned to the locked state (step S23).

If it is determined that the IC card auto-locking state storage flag is not ON at step S21, the routine of the IC card auto-locking remains in OFF state and the IC card 49 is returned to the locked state (step S23).

In contrast, if the result is Yes at step S19, this means that the user operation has occurred before the arrival of the time to stop the IC card unlocking timer (step S20). Then, the flow proceeds to step S24 where, similarly to step S21, it is determined whether the IC card auto-locking state storage flag is ON or not. If the IC card auto-locking state storage flag is ON at step S24, the flow proceeds to step S25 where the IC card auto-locking state storage flag is restored to ON so that the IC card auto-locking is restored to the ON state, and the flow goes to step S26. Alternatively, if the IC card auto-locking state storage flag is not ON (OFF) at step S24, the flow goes to step S26 while maintaining the IC card auto-locking in the OFF state. At step S26, the IC card unlocking timer is stopped in the middle of time measurement and further the IC card 49 is returned to the locked state (step S27).

Now there will be described a flow starting when the result is Yes at step S11. If it is determined that the IC card unlocking timer is already operating when the schedule management program shown in FIG. 5 is activated (at step S11), the flow goes to step S28. At step S28, it is determined whether the operating IC card unlocking timer stops first (corresponding to a time of shifting from locked state (ON) to unlocked state (OFF) in schedule 2 shown in FIG. 6) or the IC card unlocking timer activated later stops first (corresponding to a time of shifting from locked state (ON) to unlocked state (OFF) in schedule 6 shown in FIG. 6). If it is determined that the one activated later stops first, the flow ends without performing any operation, i.e. without newly activating the IC card unlocking timer. On the other hand, if it is determined that the operating IC card unlocking timer stops first, the flow goes to step S29 where the IC card unlocking timer is newly activated and newly starts measuring time and the IC card unlocking timer activated earlier is forcefully stopped at step S30. At this point, the ON/OFF state of the IC card auto-locking state storage flag, which is established upon activation of the IC card unlocking timer activated earlier, remains as it is.

After step S30, the flow goes to step S19 where the operation as described above is performed.

The flowcharts shown in FIGS. 4 and 5 are basic routines. Now, there well be described various aspects of the IC card locking ON/OFF according to the present embodiment. The reference characters of the elements in the present embodiment may be omitted and only their names may be mentioned in the following description.

FIG. 6 is a chart showing a shifting pattern of the locking state (ON/OFF) in a case where two or more schedules are set up.

When there are two or more schedules whose unlocking times overlap one another, the locking state remains OFF for the whole period of unlocking time set up in any one of the schedules.

Figure 7:
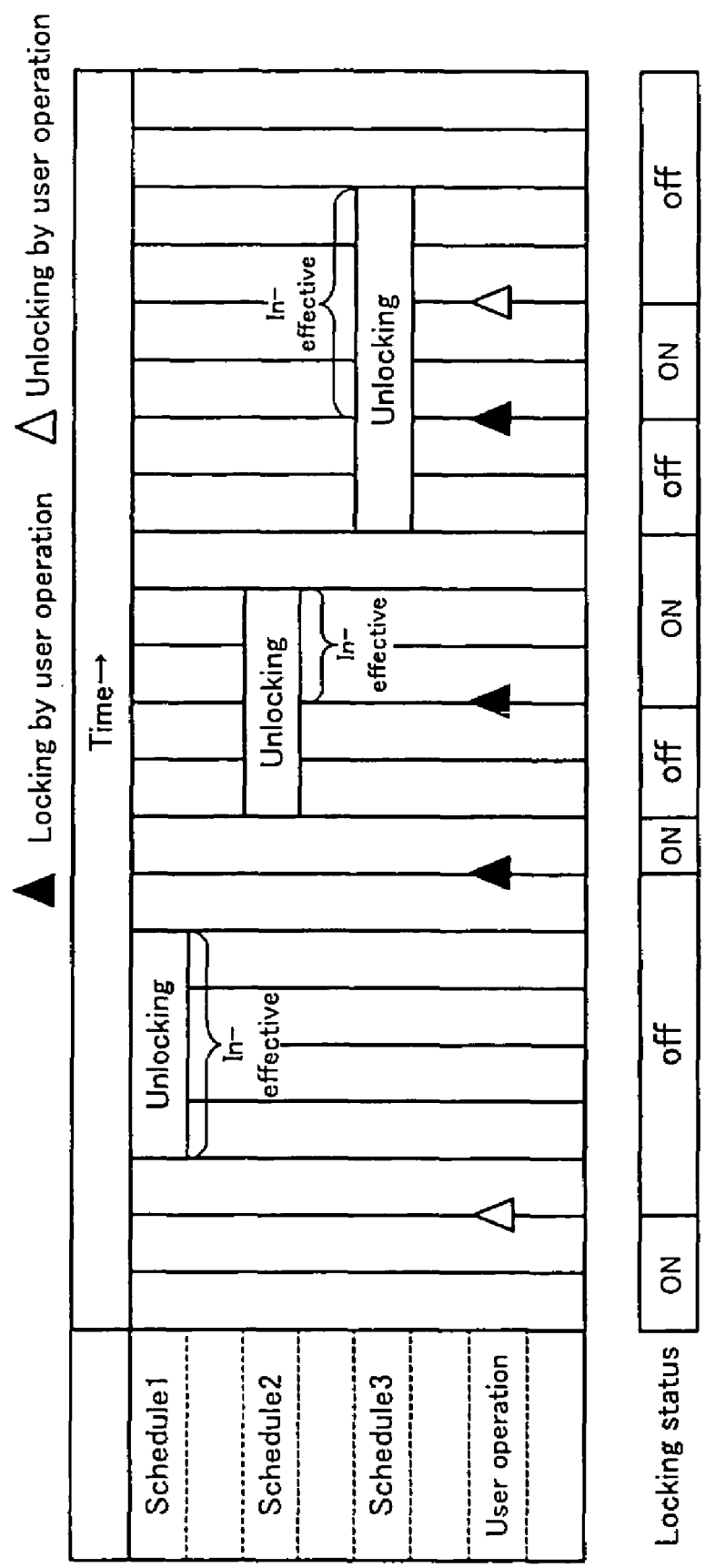
FIG. 7 is a chart showing a shifting pattern of the locking state (ON/OFF) in a case where schedules and user operation are both present.

FIG. 7 is a chart showing a shifting pattern of the locking state (ON/OFF) in a case where schedules and user operation are both present. In this case, it is assumed that the auto-locking (processing described with reference to FIG. 4, starting from unlocking (lock OFF) by user operation and then automatically returning to locking state (lock ON) after a predetermined lapse of time) is OFF.

As shown in schedule 1, first, the IC card becomes unlocked by user's unlocking operation when it is in locked state. The schedule 1 is ineffective while the IC card is in unlocked state even when an unlocking time (lock OFF) according to the schedule 1 arrives.

As shown in schedule 2, when an unlocking time (lock OFF) in the schedule 2 arrives, the IC card becomes unlocked (lock OFF). Subsequently, when the IC card is locked by user's locking operation, the schedule 2 becomes ineffective thereafter.

As shown in schedule 3, when an unlocking time (lock OFF) arrives in the schedule 3, the IC card becomes unlocked (lock OFF). In this state, when the IC card is locked by user's locking operation, the schedule 3 becomes ineffective. Subsequently, the IC card is unlocked by user's unlocking operation. Thereafter, even when a locking time (lock ON) arrives in the schedule 3, the IC card remains unlocked (lock OFF).

Figure 8:
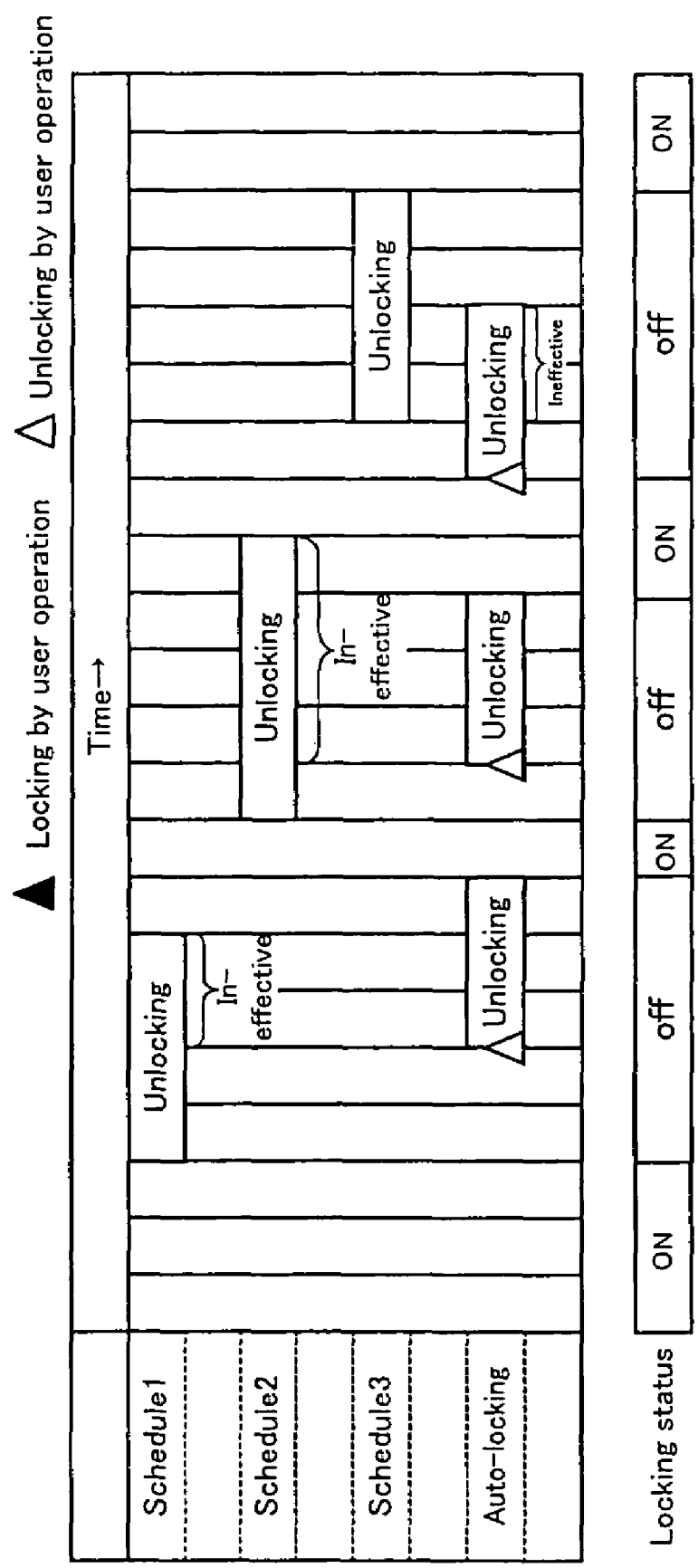
FIG. 8 is a chart showing a shifting pattern of the locking state (ON/OFF) in a case where schedules and auto-locking are both present.

FIG. 8 is a chart showing a shifting pattern of the locking state (ON/OFF) in a case where schedules and the auto-locking are both present. In this case, as described with reference to FIG. 4, the auto-locking is the processing that begins upon unlocking (lock OFF) by user operation and then automatically returns to locking state (lock ON) after a predetermined lapse of time.

As shown in schedule 1, when user's unlocking operation is made while the IC card is being unlocked (lock OFF) according to the schedule 1, the schedule 1 becomes ineffective and the auto locking becomes effective thereafter. After a predetermined lapse of time according to the auto-locking, the IC card becomes locked (lock ON).

As shown in schedule 2, when user's unlocking operation is made after the IC card is unlocked (lock OFF) according to the schedule 2, the schedule 2 becomes ineffective thereafter. Similarly to the above schedule 1, the IC card becomes locked (lock ON) after a predetermined lapse of time according to the auto-locking.

As shown in schedule 3, when user's unlocking operation is made while the IC card is being locked (lock ON), the IC card becomes unlocked (lock OFF). Subsequently, when an unlocking time (lock OFF) in the schedule 3 arrives before a predetermined lapse of time according to the auto-locking, the auto-locking becomes ineffective. After that, when a locking time (lock ON) arrives in the schedule 3, the IC card becomes locked (lock ON).

Figure 9:
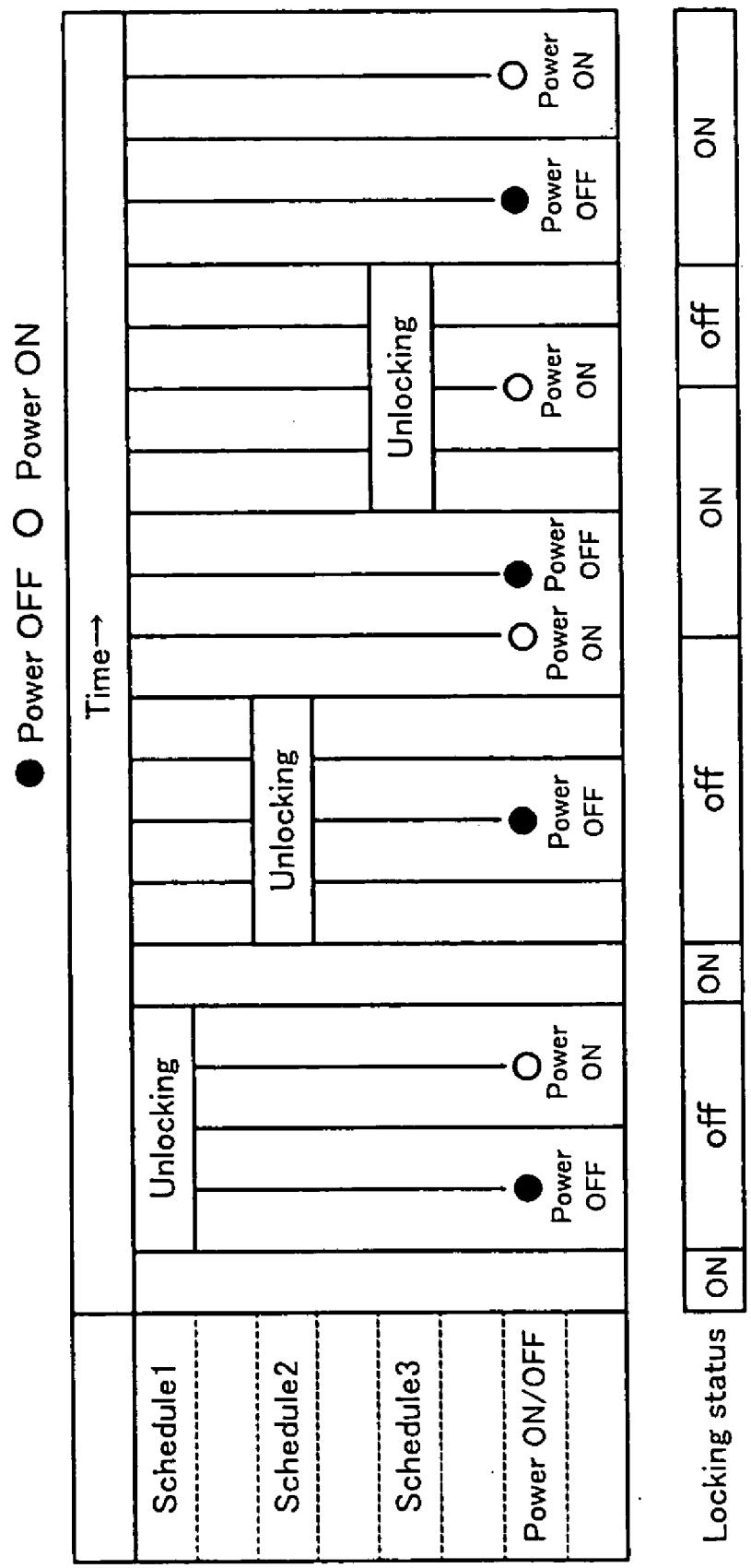
FIG. 9 is a chart showing a shifting pattern of the locking state (ON/OFF) in a case where schedules and the power ON/OFF of the portable terminal are both present.

FIG. 9 is a chart showing a shifting pattern of the locking state (ON/OFF) in a case where schedules and the power ON/OFF of the portable terminal device are both present.

As described above, the locking ON/OFF state cannot be changed when the power is OFF in the present embodiment. Therefore, the time of locking ON by a schedule or the time of power ON, whichever later, is used to lock the IC card.

As shown in schedule 1, first, the IC card becomes unlocked (lock OFF) according to the schedule 1. In this state, when a locking time (lock ON) arrives in the schedule 1 after the power is turned OFF and then turned ON, the IC card becomes locked (lock ON) when a locking time (lock ON) arrives according to the schedule 1.

Subsequently, as shown in schedule 2, the IC card becomes unlocked (lock OFF) according to the schedule 2. In this state, when the power is turned OFF, the IC card remains unlocked (lock OFF). The IC card remains unlocked (lock OFF) even when a locking time (lock ON) arrives in the schedule 2 but it becomes locked (lock ON) when the power is subsequently turned ON.

Subsequently, as shown in schedule 3, the IC card remains locked (lock ON) even when an unlocking time (lock OFF) arrives in the schedule 3 because the power is turned OFF before that. In this state, upon turning ON of the power, the schedule 3 becomes effective and the IC card becomes unlocked (lock OFF). Subsequently, when a locking time (lock ON) arrives in the schedule 3, the IC card becomes locked (lock ON).

In this way, even when the power is turned OFF while the IC card is being locked and the power is subsequently turned ON, the IC card remains locked.

Figure 10:
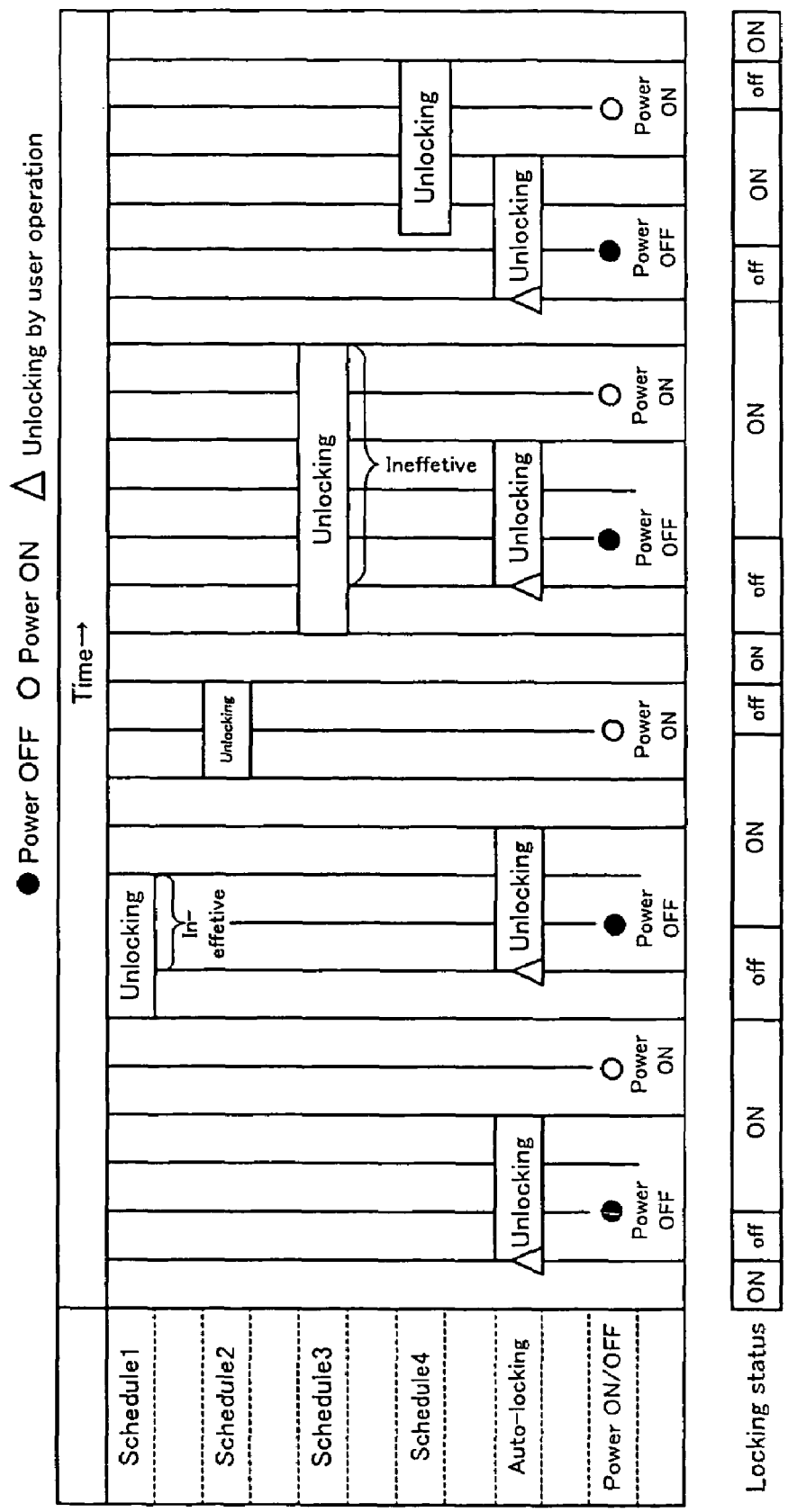
FIG. 10 is a chart showing a shifting pattern of the locking state (ON/OFF) in a case where schedules, the auto-locking and the power ON/OFF of the portable terminal are present.

FIG. 10 is a chart showing a shifting pattern of the locking state (ON/OFF) in a case where schedules, the auto-locking and the power ON/OFF of the portable terminal device are present.

First, after the IC card is unlocked by user's unlocking operation, when the power is turned OFF before a predetermined lapse of time according to the auto-locking, the IC card becomes locked (lock ON).

As shown in schedule 1, after the power is subsequently turned ON, the IC card becomes unlocked (lock OFF) when an unlocking time (lock OFF) arrives according to the schedule 1. In this state, when the IC card is unlocked by user's unlocking operation before a locking time (lock ON) in the schedule 1, the schedule 1 becomes ineffective and the auto-locking becomes effective starting time measurement. Subsequently, when the power is turned OFF before a predetermined elapse of time according to the auto-locking, the IC card becomes locked (lock ON).

Subsequently, as shown in schedule 2, the IC card remains locked (lock ON) even when an unlocking time (lock OFF) arrives according to the schedule 2. In this state, when the power is turned ON, the IC card becomes unlocked (lock OFF) according to the schedule 2.

Subsequently, as shown in schedule 3, when an unlocking time (lock OFF) arrives according to the schedule 3, the IC card becomes unlocked (lock OFF). In this state, when the power is turned OFF after the IC card is unlocked by user's unlocking operation, the IC card becomes locked (lock ON).

Subsequently, after the power is turned ON, the IC card becomes unlocked (lock OFF) by user's unlocking operation. In this state, when the power is turned OFF, the IC card becomes locked (lock ON). Immediately after that, even when an unlocking time (lock OFF) arrives according to schedule 4, the IC card remains locked (lock ON). Subsequently, when the power is turned ON, the IC card becomes unlocked (lock OFF) according to the schedule 4. In this state, when an unlocking time (lock OFF) arrives according to the schedule 4, the IC card becomes locked (lock ON).

Figure 11:
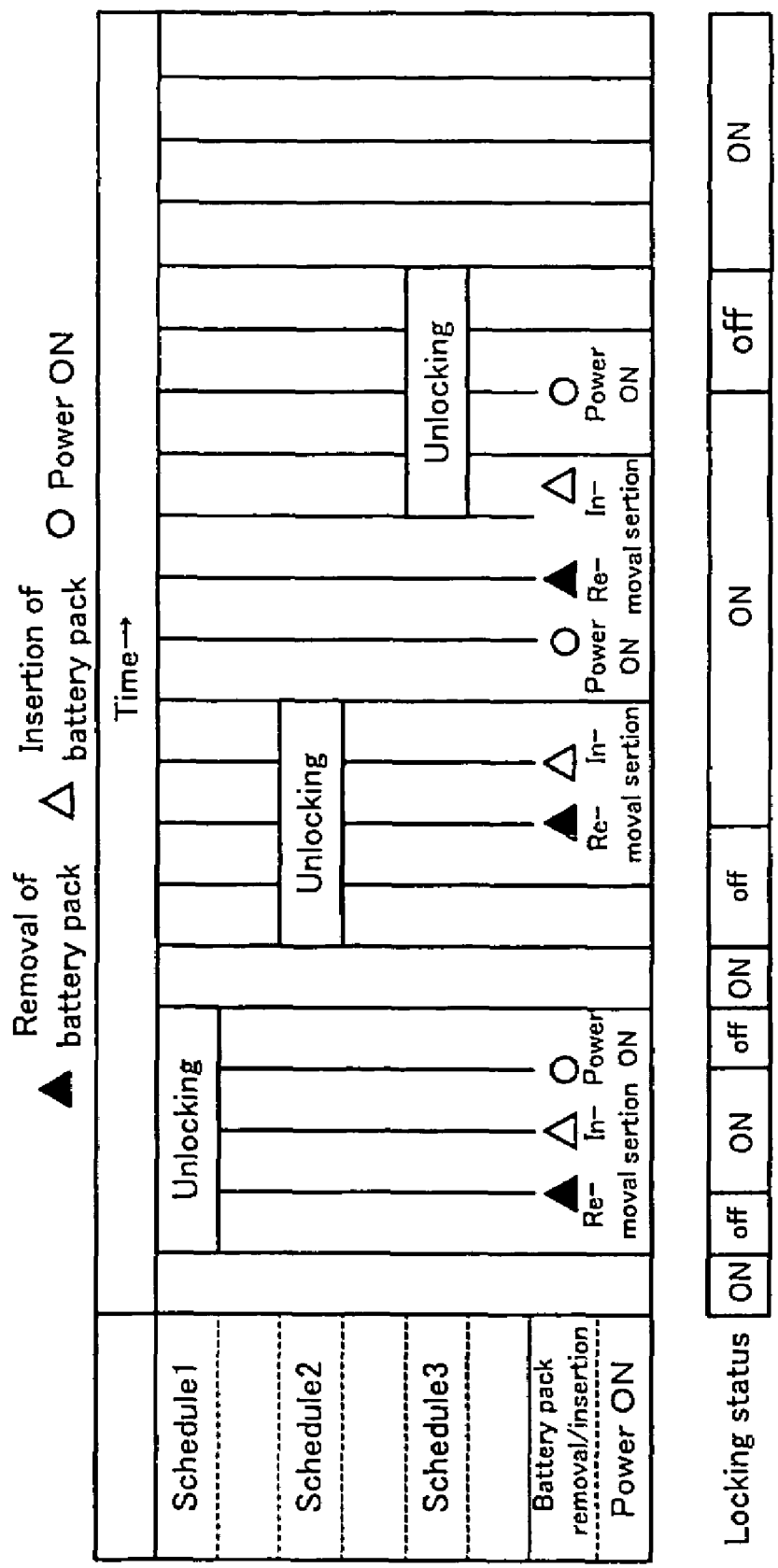
FIG. 11 is a chart showing a shifting pattern of the locking state (ON/OFF) in a case where schedules, the insertion/removal of a battery pack and the power ON/OFF of the portable terminal are present.

FIG. 11 is a chart showing a shifting pattern of the locking state (ON/OFF) in a case where schedules, the insertion/removal of the battery pack and the power ON/OFF of the portable terminal device are present.

If the battery pack is caused to come off the portable terminal device, for example, by the device being dropped, the IC card becomes locked because it is not supplied with the power.

On the other hand, even when the battery pack is inserted, the power is not turned ON by that event alone. Therefore, the insertion of the battery pack is ignored in relation to the locking ON/OFF of the IC card. When a user turns ON the power after inserting the battery pack, the operations based on the power ON described so far are performed.

First, when an unlocking time (lock OFF) arrives according to schedule 1, the IC card becomes unlocked (lock OFF). In this state, when the battery pack is removed, the IC card becomes locked (lock ON). Subsequently, even when the battery pack is inserted, the locking ON state is maintained. After that, when the power is turned ON, the IC card becomes unlocked (lock OFF). In this state, when a locking time (lock ON) arrives according the schedule 1, the IC card becomes locked (lock ON).

Subsequently, when an unlocking time (lock OFF) arrives according to schedule 2, the IC card becomes unlocked (lock OFF). In this state, when the battery pack is removed, the IC card becomes locked (lock ON). After that, the IC card remains locked (lock ON) even when the battery pack is inserted and then a locking time (lock ON) arrives according to the schedule 2. When the power is subsequently turned ON and then even when the battery pack is removed, the IC card remains locked (lock ON). Further, even when an unlocking time (lock OFF) arrives according to schedule 3, the IC card remains locked (lock ON). The IC card still remains locked even when the battery pack is inserted but it becomes unlocked (lock OFF) according to the schedule 3 when the power is turned ON. After that, when a locking time (lock ON) arrives according to the schedule 3, the IC card becomes locked (lock ON).

Figure 12:
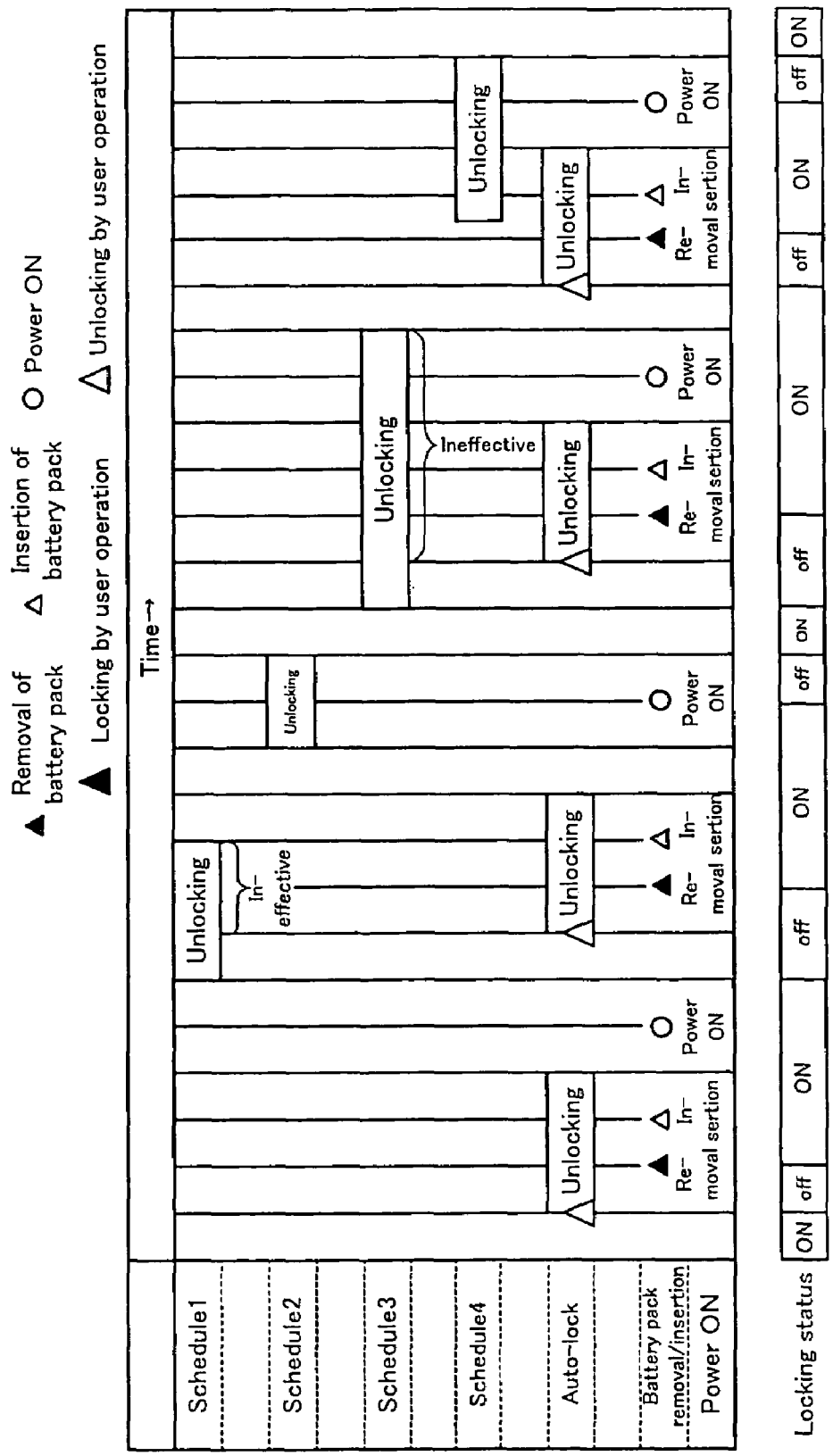
FIG. 12 is a chart showing a shifting pattern of the locking state (ON/OFF) in a case where schedules, the auto-locking, the insertion/removal of the battery pack and the power ON/OFF of the portable apparatus are present.

FIG. 12 is a chart showing a shifting pattern of the locking state (ON/OFF) in a case where schedules, the auto-locking, the insertion/removal of the battery pack and the power ON/OFF of the portable terminal device are present.

First, when the IC card is unlocked by user's unlocking operation, the auto-locking becomes effective. When the battery pack is removed during the unlocking period according to the auto-locking, the IC card becomes locked (lock ON). The IC card remains locked (lock ON) even when the battery pack is inserted and then the power is turned ON.

Subsequently, when an unlocking time (lock OFF) arrives according to schedule 1, the IC card becomes unlocked (lock OFF). In this state, when the IC card is unlocked by user's unlocking operation, the schedule 1 becomes ineffective while the auto-locking becomes effective. Subsequently, the IC card is locked (lock ON) when the battery pack is removed and remains locked (lock ON) even when the battery pack is inserted immediately after that. Further, the IC card still remains locked even when an unlocking time (lock OFF) arrives according to schedule 2. In this state, when the power is turned ON during the unlocking period of the schedule 2, the IC card becomes unlocked (lock OFF). After that, when a locking time (lock ON) arrives according to the schedule 2, the IC card becomes locked (lock ON).

Subsequently, when an unlocking time (lock OFF) arrives according to schedule 3, the IC card becomes unlocked (lock OFF). In this state, when user's unlocking operation is made, the schedule 3 becomes ineffective while the auto-locking becomes effective. After that, when the battery pack is moved, the IC card becomes locked (lock ON). The IC card remains locked (lock ON) thereafter even when the battery pack is inserted and then the power is turned ON.

Subsequently, after the IC card is unlocked by user's unlocking operation, when the battery pack is removed, the IC card becomes locked (lock ON). In this state, even when an unlocking time (lock OFF) arrives according to schedule 4 and then the battery pack is inserted, the locking ON state is maintained. Subsequently, when the power is turned on during the unlocking period according to the schedule 4, the IC card becomes unlocked (lock OFF). In this state, when a locking time (lock ON) arrives according to the schedule 4, the IC card becomes locked (lock ON).

As described above, according to the present embodiment, schedules, auto-locking, the insertion/removal of the battery pack and the power ON/OFF of the portable terminal device are well coordinated.

What is claimed is:

1. A portable apparatus which has an IC card function capable of performing a predetermined operation via wireless communications, the portable apparatus comprising:
 a lock switching operation section which switches the IC card function between a locked state in which the IC card function is ineffective and an unlocked state in which the IC card function is effective;
 a timer which measures time from a point in time when the IC card function is unlocked through the lock switching operation section;
 an auto-locking processing section which automatically changes the IC card function to the locked state when the time measured by the timer reaches a predetermined threshold time; and
 power switch which turns on and off a power of the portable apparatus,
 wherein the auto-locking processing section changes the IC card function to the locked state when the power is turned off, after the IC card function is unlocked through the lock switching operation section and before the time measured by the timer reaches the predetermined threshold time.

2. The portable apparatus according to claim 1, further comprising a threshold setting section which sets the predetermined threshold time.

3. The portable apparatus according to claim 1, further comprising:
 a clock section which keeps the current time; and
 a schedule management section which changes the IC card function from the locked state to the unlocked state and from the unlocked state to the locked state according to a schedule.

4. The portable apparatus according to claim 3, wherein the schedule management section stops a function of the auto-locking processing section upon changing the IC card function from the locked state to the unlocked state, and restores the function of the auto-locking processing section upon changing the IC card function from the unlocked state to the locked state.

5. The portable apparatus according to claim 3, wherein in such a case that the IC card function is already in the unlocked state at a first time of shifting the IC card function from the locked state to the unlocked state, the schedule management section maintains the locked state or the unlocked state of the IC card function established immediately before a second time of shifting the IC card function from the unlocked state to the locked state even when the second time arrives.

6. The portable apparatus according to claim 3, wherein in such a case that the lock switching operation section is operated once or more after a time of shifting the IC card function from the locked state to the unlocked state and before a time of shifting the IC card function from the unlocked state to the locked state, the schedule management section maintains the locked state or the unlocked state of the IC card function established immediately before the time of shifting the IC card function from the unlocked state to the locked state even when the time of shifting the IC card function from the unlocked state to the locked state arrives.

7. A portable apparatus which has an IC card function capable of performing a predetermined operation via wireless communications, the portable apparatus comprising:
a lock switching operation section which switches the IC card function between a locked state in which the IC card function is ineffective and an unlocked state in which the IC card function is effective;
a timer which measures time from a point in time when the IC card function is unlocked through the lock switching operation section;
an auto-locking processing section which automatically changes the IC card function to the locked state when the time measured by the timer reaches a predetermined threshold time; and
a power switch which turns on and off a power of the portable apparatus,
wherein in such a case that the power is turned off after a time of shifting the IC card function from the locked state to the unlocked state and before a time of shifting the IC card function from the unlocked state to the locked state, the schedule management section shifts the IC card function from the unlocked state to the locked state when the power is turned on or when the time of shifting the IC card function from the unlocked state to the locked state arrives, whichever is later.

8. A storage medium which stores a program of controlling IC card function lock, the program being executed in a portable apparatus having an IC card function capable of performing a predetermined operation via wireless communications and causes the portable apparatus to operate as an apparatus comprising:
a lock switching operation section which switches the IC card function between a locked state in which the IC card function is ineffective and an unlocked state in which the IC card function is effective;
a timer which measures time from a point in time when the IC card function is unlocked through the lock switching operation section;
an auto-locking processing section which automatically changes the IC card function to the locked state when the time measured by the timer reaches a predetermined threshold time; and
a power switch which turns on and off a power of the portable apparatus,
wherein the auto-locking processing section changes the IC card function to the locked state when the power is turned off, after the IC card function is unlocked through the lock switching operation section and before the time measured by the timer reaches the predetermined threshold time.

9. The storage medium according to claim 8, wherein the portable apparatus further comprises a threshold setting section which sets the predetermined threshold time.

10. The storage medium according to claim 8, wherein the portable apparatus further comprises:
a clock section which keeps the current time; and
a schedule management section which changes the IC card function from the locked state to the unlocked state and from the unlocked state to the locked state according to a schedule.

11. A method of controlling locking and unlocking of an IC card function incorporated in a portable apparatus and capable of performing a predetermined operation via wireless communications, the portable apparatus comprising a lock switching operation section which switches the IC card function between a locked state in which the IC card function is ineffective and an unlocked state in which the IC card function is effective, the method comprising:
measuring time from a point in time when the IC card function is unlocked through the lock switching operation section;
auto-locking the IC card function by automatically changing the IC card function to the locked state when the time measured by the timer reaches a predetermined threshold time; and
power switch which turns on and off a power of the portable apparatus, and
wherein the auto-locking changes the IC card function to the locked state when the power is turned off after the IC card function is unlocked through the lock switching operation section and before the time measured by the timer reaches the predetermined threshold time.

12. The method according to claim 11, further comprising setting a threshold which sets the predetermined threshold time.

13. The method according to claim 11, wherein the portable apparatus further comprises a clock section which keeps the current time, and
wherein the method further comprises a step of managing a schedule which changes the IC card function from the locked state to the unlocked state and from the unlocked state to the locked state according to a schedule.

14. The method according to claim 13, wherein the step of managing the schedule stops processing in the step of auto-locking upon changing the IC card function from the locked state to the unlocked state, and restarts the processing in the step of auto-locking upon changing the IC card function from the unlocked state to the locked state.

15. The method according to claim 13, wherein in such a case that the IC card function is already in the unlocked state at a first time of shifting the IC card function from the locked state to the unlocked state, the step of managing the schedule maintains the locked state or the unlocked state of the IC card function established immediately before a second time of shifting the IC card function from the unlocked state to the locked state even when the second time arrives.

16. The method according to claim 13, wherein in such a case that the lock switching operation section is operated once or more after a time of shifting the IC card function from the locked state to the unlocked state and before a time of shifting the IC card function from the unlocked state to the locked state, the step of managing the schedule maintains the locked state or the unlocked state of the IC card function established immediately before the time of shifting the IC card function from the unlocked state to the locked state even when the time of shifting the IC card function from the unlocked state to the locked state arrives.

17. A method of controlling locking and unlocking of an IC card function incorporated in a portable apparatus and capable of performing a predetermined operation via wireless communications, the portable apparatus comprising a lock switching operation section which switches the IC card function between a locked state in which the IC card function is ineffective and an unlocked state in which the IC card function is effective, the method comprising:
measuring time from a point in time when the IC card function is unlocked by through the lock switching operation section;
auto-locking the IC card function by automatically changing the IC card function to the locked state when the time measured by the timer reaches a predetermined threshold time; and managing a schedule which changes the IC card function from the locked state to the unlocked state and from the unlocked state to the locked state according to a schedule, wherein the portable apparatus further comprises a power switch which turns on and off a power of the portable apparatus, and wherein in such a case that the power is turned off after a time of shifting the IC card function from the locked state to the unlocked state and before a time of shifting the IC card function from the unlocked state to the locked state, the step of managing the schedule shifts the IC card function from the unlocked state to the locked state when the power is turned on or when the time of shifting the IC card function from the unlocked state to the locked state arrives, whichever is later.

* * * * *

UNITED STATES PATENT AND TRADEMARK OFFICE
CERTIFICATE OF CORRECTION

| | |
|---|---|
| PATENT NO. | : 7,628,335 B2 |
| APPLICATION NO. | : 11/392628 |
| DATED | : December 8, 2009 |
| INVENTOR(S) | : Yoichi Morimoto et al. |

Page 1 of 1

It is certified that error appears in the above-identified patent and that said Letters Patent is hereby corrected as shown below:

Column 14, Line 11, before "power switch" insert --a--.

Signed and Sealed this

Ninth Day of March, 2010

David J. Kappos
*Director of the United States Patent and Trademark Office*